United States Patent
Zhai et al.

(10) Patent No.: US 11,402,496 B2
(45) Date of Patent: Aug. 2, 2022

(54) METHOD AND APPARATUS FOR ENHANCING SEMANTIC FEATURES OF SAR IMAGE ORIENTED SMALL SET OF SAMPLES

(71) Applicant: WUYI University, Guangdong (CN)

(72) Inventors: Yikui Zhai, Guangdong (CN); Wenbo Deng, Guangdong (CN); Qirui Ke, Guangdong (CN); He Cao, Guangdong (CN)

(73) Assignee: WUYI University, Guangdong (CN)

( * ) Notice: Subject to any disclaimer, the term of this patent is extended or adjusted under 35 U.S.C. 154(b) by 470 days.

(21) Appl. No.: 16/532,375

(22) Filed: Aug. 5, 2019

(65) Prior Publication Data

US 2021/0003700 A1 Jan. 7, 2021

(30) Foreign Application Priority Data

Jul. 2, 2019 (CN) .......................... 201910588329.7

(51) Int. Cl.
*G01S 13/90* (2006.01)
*G06N 3/08* (2006.01)

(52) U.S. Cl.
CPC ...... *G01S 13/9027* (2019.05); *G01S 13/9005* (2013.01); *G01S 13/9029* (2013.01); *G06N 3/08* (2013.01)

(58) Field of Classification Search
CPC ............ G01S 13/9027; G01S 13/9005; G01S 13/9029
USPC ..................................................... 342/90, 179
See application file for complete search history.

(56) References Cited

U.S. PATENT DOCUMENTS

2010/0109938 A1* 5/2010 Oswald ................. G01S 13/522
707/E17.014

\* cited by examiner

*Primary Examiner* — Bo Fan
(74) *Attorney, Agent, or Firm* — Farjami & Farjami LLP

(57) ABSTRACT

The present disclosure relates to a method for enhancing sematic features of SAR image oriented small set of samples, comprising: acquiring a sample set of an SAR target image, and performing transfer learning and training on the sample set to obtain a initialized deep neural network of an SAR target image, the sample set comprising an SAR target image and an SAR target virtual image; performing network optimization on the deep neural network by an activation function, and extracting features of the SAR target image by the optimized deep neural network to obtain a feature map; and mapping, by an auto-encoder, the feature map between a feature space and a semantic space to obtain a deep visual feature with an enhanced semantic feature.

8 Claims, 3 Drawing Sheets

METHOD AND APPARATUS FOR ENHANCING SEMANTIC FEATURES OF SAR IMAGE ORIENTED SMALL SET OF SAMPLES

CROSS REFERENCE TO RELATED APPLICATION

This application claims the benefit of CN patent application no. 201910588329.7, filed Jul. 2, 2019, the entire disclosures of which are hereby incorporated herein by reference.

TECHNICAL FIELD

The present disclosure relates to the technical field of image recognition, and in particular to method and apparatus for enhancing semantic features of SAR image oriented small set of samples.

BACKGROUND OF THE PRESENT DISCLOSURE

The Synthetic Aperture Radar (SAR) is a microwave imaging apparatus with extremely high resolution, which realizes the imaging of a ground scene by a pulse compression technology and a synthetic aperture principle and plays an important role in fields such as environmental monitoring, resource exploration, mapping and battlefield investigation. With the progress of the construction in Guangdong-Hong Kong-Macao Greater Bay Area, the safety monitoring in the Bay Area has increasing requirements for the application of SAR images, particularly in aspects such as remote sensing aircraft monitoring, ship target dynamic monitoring and oil spillage pre-warning dynamic monitoring. However, due to insufficient labeled sample size of the Bay Area, it is prone to over-fitting, falling into a local optical solution, slow convergence speed and other problems during the conventional feature extraction model training process, resulting in degradation of the model generalization capability. Moreover, the SAR target detection has certain difficulty in detecting multiple targets in a complex scene, so that the accurate extraction of target features in the Bay Area is influenced. Therefore, it is urgent to establish a mechanism that can solve the problem of small sample size in the Bay Area and enhance the features of SAR images.

SUMMARY OF THE PRESENT DISCLOSURE

To solve the above problems, an objective of the present disclosure is to provide a method and apparatus for enhancing sematic features of SAR image oriented small set of samples, which can solve the problem of small sample size in the Bay Area, increase the network convergence speed, enhance the expression capability of semantic and feature spaces of an SAR image, and thus improve the accuracy of SAR image target recognition.

To solve the problems, the present disclosure employs the following technical solutions. In a first aspect, an embodiment of the present disclosure provides a method for enhancing semantic features of SAR image oriented small set of samples, including the following steps of:

acquiring a sample set of an SAR target image, and performing transfer learning and training on the sample set to obtain an initialized deep neural network of an SAR target image, the sample set including an SAR target image and an SAR target virtual image;

performing network optimization on the deep neural network by an activation function, and extracting features of the SAR target image by the optimized deep neural network to obtain a feature map; and mapping, by an auto-encoder, the feature map between a feature space and a semantic space to obtain a deep visual feature with an enhanced semantic feature.

Further, the acquiring a sample set of an SAR target image and performing transfer learning and training on the sample set to obtain an initialized deep neural network of an SAR target image includes the following steps of:

acquiring an SAR target image, and establishing a deep neural network of the SAR target image;

acquiring a sample set of virtual images in different aspects of the same category as the SAR target image, and extracting a parameter and a weight of the sample set by a feature extraction layer of a convolutional network; and initializing a deep neural network of the SAR target image by using the parameter and weight of the sample set.

Further, the deep neural network includes a deep residual ResNet network or a DenseNet network.

Further, the performing network optimization on the deep neural network by an activation function and extracting features of the SAR target image by the optimized deep neural network to obtain a feature map includes the following steps of:

connecting a Maxout activation function layer behind a last fully-connected layer of the deep neural network, and inputting the SAR target image into the deep neural network containing the Maxout activation function layer for feature extraction to obtain a local maximum weight of features;

connecting a ReLU activation function layer behind the Maxout activation function layer, and inputting the local maximum weight into the ReLU activation function layer for processing to obtain a local optimal weight; and connecting an additional fully-connected layer behind the ReLU activation function layer, and inputting the local optimal weight into the additional fully-connected layer for classification to obtain a feature map.

Further, the performing network optimization on the deep neural network by an activation function and extracting features of the SAR target image by the optimized deep neural network to obtain a feature map further includes the following step of:

calculating a gradient loss of the feature map by a Softmax-MSE loss function, and minimizing the gradient loss by reversely adjusting the optimized deep neural network to obtain a fitted feature map.

Further, the auto-encoder includes an encoder and a decoder.

Further, the mapping, by an auto-encoder, the feature map between a feature space and a semantic space to obtain a deep visual feature with an enhanced semantic feature includes the following steps of:

inputting the feature map into a neural network, and extracting, by an encoder, a feature value of each layer of the neural network;

simulating the feature value by Gaussian white noise to obtain a simulated feature value;

mapping, by the encoder, the simulated feature value from a feature space to a semantic space to obtain a semantically-enhanced semantic feature value; and mapping, by a decoder, the semantic feature value from the semantic space to the feature space to obtain a feature-enhanced deep visual feature.

In a second aspect, an embodiment of the present disclosure further provides an apparatus for enhancing semantic features of SAR image oriented small set of samples, including at least one control processor and a memory for communicating with the at least one control processor; the memory stores instructions that can be executed by the at least one control processor; and, the instructions enable, when executed by the at least one processor, the at least one control processor to execute the method for enhancing semantic features of SAR image oriented small set of samples described above.

In a third aspect, an embodiment of the present disclosure further provides a computer readable storage medium storing computer executable instructions for causing a computer to execute the method for enhancing semantic features of SAR image oriented small set of samples described above.

The technical solutions provided in the embodiments of the present disclosure have at least the following beneficial effects. By performing transfer learning and training on a sample set, an initialized deep neural network of an SAR target image is realized, so that the disadvantage that accurate feature values cannot be obtained by training due to insufficient sample size of the SAR target image is improved and the convergence speed of the deep neural network is effectively improved. By performing network optimization on the deep neural network by an activation function, the feature values are more accurate. By mapping, by an auto-encoder, the feature map between a feature space and a semantic space, the expression capability of the semantic space and the feature space of the SAR image can be enhanced, and the accuracy of SAR image target recognition is improved.

BRIEF DESCRIPTION OF THE DRAWINGS

The present disclosure will be further described below by way of examples with reference to the accompanying drawings, in which.

DETAILED DESCRIPTION OF THE PRESENT DISCLOSURE

With the progress of the construction in Guangdong-Hong Kong-Macao Greater Bay Area, the safety monitoring in the Bay Area has increasing requirements for the application of SAR images, particularly in aspects such as remote sensing aircraft monitoring, ship target dynamic monitoring and oil spillage pre-warning dynamic monitoring. However, due to insufficient labeled sample size of the Bay Area, it is prone to over-fitting, falling into a local optical solution, slow convergence speed and other problems during the conventional feature extraction model training process, resulting in the degradation of the model generalization capability. Moreover, the SAR target detection has certain difficulty in detecting multiple targets in a complex scene, so that the accurate extraction of target features in the Bay Area is influenced.

On this basis, the present disclosure provides a method and apparatus for enhancing semantic features of SAR image oriented small set of samples, which can solve the problem of small sample size in the Bay Area, increase the network convergence speed, enhance the expression capability of semantic and feature spaces of an SAR image and thus improve the accuracy of SAR image target recognition.

The embodiments of the present disclosure will be further described below with reference to the accompanying drawings.

Figure 1:
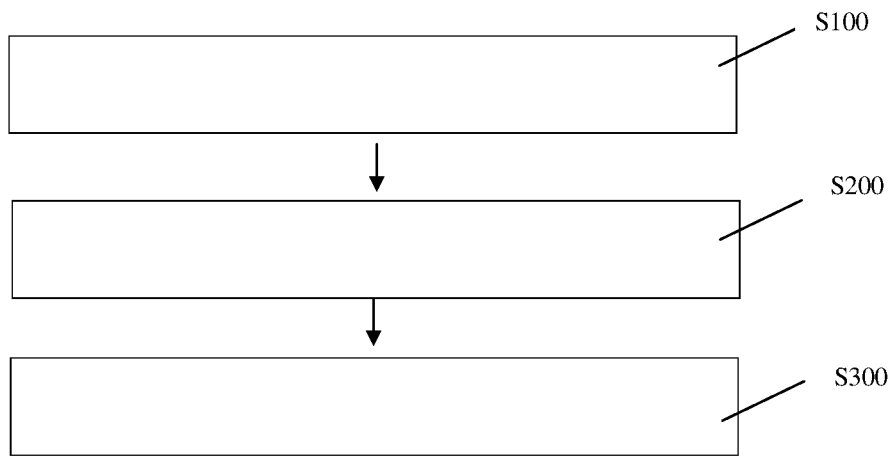
FIG. 1 is an overall flowchart of one embodiment of a method for enhancing semantic features SAR image oriented small set of samples according to the present disclosure.

With reference to FIG. 1, in an embodiment of the present disclosure, a method for enhancing semantic features of SAR image oriented small set of samples is provided, comprising the following steps.

Step S100: A sample set of an SAR target image is acquired, and transfer learning and training is performed on the sample set to obtain an initialized deep neural network of an SAR target image, where the sample set comprises an SAR target image and an SAR target virtual image.

Step S200: Network optimization is performed on the deep neural network by an activation function, and features of the SAR target image are extracted by the optimized neural network to obtain a feature map.

Step S300: The feature map is mapped between a feature space and a semantic space by an auto-encoder to obtain a deep visual feature with an enhanced semantic feature.

In this embodiment, in the step S100, by acquiring a sample set of virtual images of which targets are in different states, such as angles, shapes or the like, from but in the same category as the target of the SAR target image, and by training the sample set of the virtual images, a feature value corresponding to each layer after the sample set has been trained is obtained. Meanwhile, transfer learning is performed on the feature value to initialize the deep neural network of the SAR target image, so that the network in each layer of the deep neural network has a fixed initialization value instead of a randomly set initialization value. By performing transfer learning and training on the sample set of the virtual images, the problem of insufficient sample size of the SAR target image is solved, the convergence speed of the deep neural network is effectively improved, and thus the accuracy of SAR image recognition is improved. The sample set of the virtual images may comprise images of a front face and a side face of a target such as an airplane or a ship in the target image, images of the target in various shapes, or the like, acquired on the Internet. The network layer of the initialized deep neural network may be any network layer before the last fully-connected layer. That is, any network layer before the last fully-connected layer may be initialized by using the feature values of the sample set of the virtual images.

In the step S200, network optimization is performed on the deep neural network by an activation function, enabling the network to have a hierarchical nonlinear mapping learning capability, for a more efficient model training. The activation function may be a sigmoid function, a tan h function, a relu function, a maxout function or the like. The extracted features of the SAR target image by the optimized deep neural network are more accurate and better in fitting effect.

In the step S300, the feature map of the SAR target image is mapped between a feature space and a semantic space by an auto-encoder, so that the SAR image has enhanced expression capability in the sematic space and the feature space, the difference between multiple layers of features is effectively explored, the complementation and enhancement of information is realized, and the accuracy of SAR image target recognition is thus improved.

Figure 2:
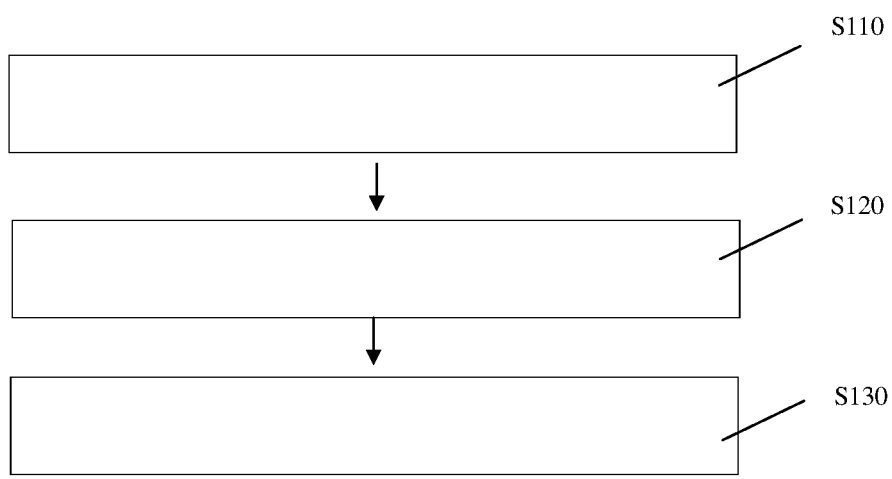
FIG. 2 is a flowchart of acquiring a sample set of an SAR target image and performing transfer learning and training on the sample set, in one embodiment of the method for enhancing semantic features SAR image oriented small set of samples according to the present disclosure.

Further, with reference to FIG. 2, in another embodiment of the present disclosure a method for enhancing semantic features of SAR image oriented small set of samples is further provided. The step of acquiring a sample set of an SAR target image and performing transfer learning and training on the sample set to obtain an initialized deep neural network of an SAR target image comprises the following sub-steps.

Step S110: An SAR target image is acquired, and a deep neural network of the SAR target image is established.

Step S120: A sample set of virtual images which are in different aspects of the same category as the SAR target image is acquired, and apparatus and a weight of the sample set are extracted by a feature extraction layer of a convolutional network.

Step S130: The deep neural network of the SAR target image is initialized by using the apparatus and weight of the sample set.

In this embodiment, in the step S110, an SAR target image is acquired, and a deep neural network is established by the SAR target image; in the step S120, a sample set of virtual images of which target are in different angles, shapes or the like but in the same category as the target of the SAR target image is acquired, and optimal apparatus and a weight of each layer of the sample set are extracted by a feature extraction layer of a convolutional network; and, in the step S130, the deep neural network of the SAR target image is initialized by using the optimal apparatus and weight of each layer of the sample set. The initialized network layer is set as any network layer before the last fully-connected layer of the deep neural network, that is, the number of the transferred layers does not exceed the number of a layer where the last fully-connected layer is located, so that the each layer of the deep neural network has a fixed initialization value instead of a randomly set initialization value. Accordingly, the learning capability of the deep neural network is improved, the problem of insufficient sample size of the SAR target image is solved, the convergence speed of the deep neural network is effectively improved, and the accuracy of SAR target image recognition is improved. Wherein, the SAR target image may be an image of a target such as an airplane or a ship detected by radar. Then, the sample set of virtual images may comprise images of the front face, side face of the target and images of the target in various shapes, the target may be an airplane, a ship or a tank or the like acquired on the Internet.

Further, in another embodiment of the present disclosure a method for enhancing semantic features of SAR image oriented small set of samples is further provided, wherein the deep neural network includes a deep residual ResNet network or a DenseNet network.

In this embodiment, the deep neural network may be set as a deep residual ResNet network, and the deep residual ResNet network preferably uses a residual network structure of ResNet-50. That is, the deep residual network has a network structure of total of 50 layers. Accordingly, the depth of the network is greatly increased, and the accuracy of feature extraction is improved. In addition, the deep residual ResNet network has a structure of residual blocks, enabling the network layers to connect in every two or three network layers in a jump manner. Accordingly, the problem that the network is too deep to train is solved, the training step of the deep network is simplified, and the recognition capability and training speed of the SAR target image are effectively improved.

Additionally, the deep neural network may also be set as a DenseNet work. The DenseNet network is a convolutional neural network with dense connections, in which a direct connection between any two network layers occurs, and the feature map of each layer is merged in the dimension of channels. Accordingly, the number of feature maps is effectively reduced, and the gradient vanishing problem is relieved. By inputting the SAR target image into the DenseNet network for feature extraction, the propagation of features can be enhanced, the training effect of the deep network is good, and the recognition rate of the SAR target image is improved.

Figure 3:
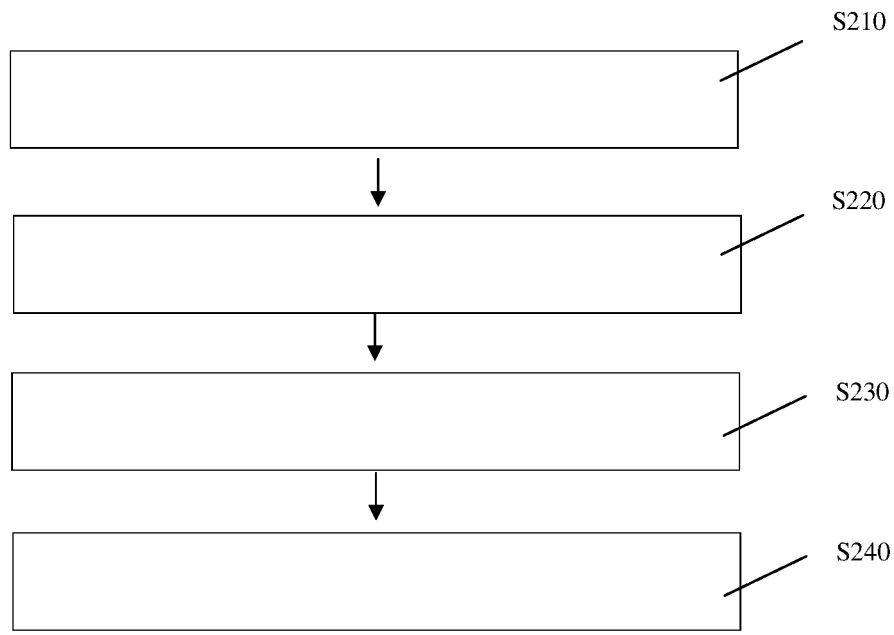
FIG. 3 is a flowchart of performing network optimization on the deep neural network by an activation function, in one embodiment of method for enhancing semantic features SAR image oriented small set of samples according to the present disclosure.

Further, with reference to FIG. 3, in another embodiment of the present disclosure a method for enhancing semantic features of SAR image oriented small set of samples is further provided. The step of performing network optimization on the deep neural network by an activation function and extracting features of the SAR target image by the optimized deep neural network to obtain a feature map comprises the following sub-steps.

Step S210: a Maxout activation function layer is connected behind a last fully-connected layer of the deep neural network, and the SAR target image is input into the deep neural network containing the Maxout activation function layer for feature extraction to obtain a local maximum weight of features.

Step S220: a ReLU activation function layer is connected behind the Maxout activation function layer, and the local maximum weight is input into the ReLU activation function layer for processing to obtain a local optimal weight.

Step S230: an additional fully-connected layer is connected behind the ReLU activation function layer, and the local optimal weight is input into the additional fully-connected layer for classification to obtain a feature map.

In this embodiment, in the step S210, the SAR target image is input into the deep neural network containing the Maxout activation function layer for feature extraction. Each input feature of the Maxout activation function layer consists of m selectable hidden layer nodes. The local maximum weight of features of the SAR target image is extracted by the following formula:

$$h_i(x) = \max_{j \in [1,k]} (x^T W_{ij} + b_{ij}), W \in R^{d*m*k}, b \in R^{m*k},$$

where $h_i$ is a local maximum weight of the $i^{th}$ feature, $x^T$ is a set of weights of the input features, $W_{ij}$ is a three-dimensional weight matrix of d*m*k, b is a two-dimensional offset vector of m*k, d is the number of input weights, and m is the number of hidden layer nodes. Each hidden layer node consists of k "invisible hidden layer" nodes, the structure of each "invisible hidden layer" is similar to that of the hidden layer node, and all the k "invisible hidden layer" nodes are output linearly.

Therefore, the Maxout activation function layer is a sustainable-learning activation function layer, the change state is determined by W, and the Maxout activation function is a piecewise linear function which can approximate to any convex function and has high fitting capability and nonlinear representation capability, so that the network can have a better local solution.

In the step S220, a ReLU activation function layer is connected behind the Maxout activation function layer. The ReLU activation function layer has unilateral suppression performance A negative value in the local maximum weight output by the Maxout activation function layer is changed to 0, and a positive value remains unchanged. The specific formula is:

$$ReLU(x) = \begin{cases} x, & x > 0 \\ 0, & x \leq 0 \end{cases}.$$

Unilateral suppression processing is performed on the local maximum weight by the ReLU activation function to obtain a local optimal solution, and the unilateral suppression performance of the ReLU activation function layer allows the features of the SAR target image to have sparse activation performance. Accordingly, the gradient divergence caused by the depth of the network is relieved, the convergence speed of the network is quickened, the generalization capability of the features of the SAR target image is enhanced, and the features of the SAR target image are thus more representative.

Therefore, the Maxout activation function is a piecewise linear function which can process data and reduce the output of data in dimensions; the ReLU activation function layer has sparse connectivity, so the training process of the deep neural network is easier; and, the continuous connection of the Maxout activation function layer and the ReLU activation function layer forms a double activation function layer. The double activation function layer has the properties of both the Maxout activation function and the ReLU activation function. Accordingly, the data of the features of the SAR target image processed by the deep neural network has a certain data dimensionality reduction capability, and the training process of the network is easier, so that the feature recognition capability of the SAR target image is improved.

In the step S230, an additional fully-connected layer is connected behind the ReLU activation function layer, and the additional fully-connected layer re-fuses and classifies the features of the SAR target image and the local optimal weight thereof and calculates a probability distribution of each feature to obtain a feature map.

Further, with reference to FIG. 3, another embodiment of the present disclosure further provides a method for enhancing semantic features of SAR image oriented small set of samples. The performing network optimization on the deep neural network by an activation function and extracting features of the SAR target image by the optimized deep neural network to obtain a feature map further includes the following steps.

Step S240: A gradient loss of the feature map is calculated by a Softmax-MSE loss function, and the gradient loss is minimized by reversely adjusting the optimized deep neural network to obtain a fitted feature map.

In this embodiment, a Softmax-MSE loss function layer is connected behind the additional fully-connected layer to calculate a gradient loss of the feature map. If it is assumed that the number of input apparatus of the Softmax-MSE loss function layer is m and the set of input apparatus is X={$x_0$, $x_1$, . . . , $x_{m-1}$} (where each element in the set of parameters represents a weight of the parameters), the $k^{th}$ parameter weight of the Softmax-MSE loss function layer is subjected to Softmax function transformation to obtain:

$$p_k = \frac{e^{x_k - max(X)}}{\sum_{i=0}^{m-1} e^{x_i - max(X)}},$$

where $p_k$ is a recognition prediction value, $k \in [0, m-1]$, and $p_k = max([p_0, p_1, \ldots, p_{m-1}])$. Then, the final category prediction value for the parameter output is:

$$\hat{y} = \sum_{k=0}^{m-1} k p_k.$$

If it is assumed that the number of input training samples of the SAR target image is n, the loss value L of the Softmax-MSE loss function layer is:

$$L = \frac{1}{n} \sum_{j=0}^{n-1} (\hat{y}_j - y_j)^2,$$

where $y_j$ is an expected value of $\hat{y}_j$, i.e., a tag value of the $j^{th}$ image. Then, the gradient of the Softmax-MSE loss function layer is:

$$\frac{\partial L_j}{\partial x_i} = \begin{cases} p_i - 1, & i = y_j \\ p_i, & i \neq y_j \end{cases}.$$

During the calculation of the gradient of the Softmax-MSE loss function, for the weight output of the $i^{th}$ parameter in the additional fully-connected layer of the network model, if the weight is equal to the expected value $y_i$ of the sample, $p_i - 1$ is counted in the gradient value; and, if the weight is not equal to the expected value $y_i$ of the sample, $p_i$ is counted in the gradient value.

The sum of the gradient value of the Softmax-MSE loss function layer is calculated. If the sum of the gradient value is large, the sum of the gradient value of the Softmax-MSE loss function layer is decreased by reversely adjusting the weight of the initialization parameter, the learning rate or other factors of optimized deep neural network, so that the fitting degree of the feature map is enhanced.

Further, another embodiment of the present disclosure further provides a method for enhancing semantic features of SAR image oriented small set of samples, wherein the auto-encoder includes an encoder and a decoder.

In this embodiment, the auto-encoder includes an encoder and a decoder. The encoder can convert an original input set into an intermediate output set, and the dimensionality of the intermediate output set is generally lower than that of the original input set. That is, the encoder can reduce the dimensionality of the original input set, and merge and combine the data of the original input set, so that the complementation of information is realized, the relationship between data is converted, and the data expression capability is improved. The decoder can receive the intermediate output set from the encoder, reconstruct the data of the intermediate output set, and convert the data into a spatial architecture of the dimensionality of the original input set. The original input set may be an image, a vector, video or audio data, or the like.

Figure 4:
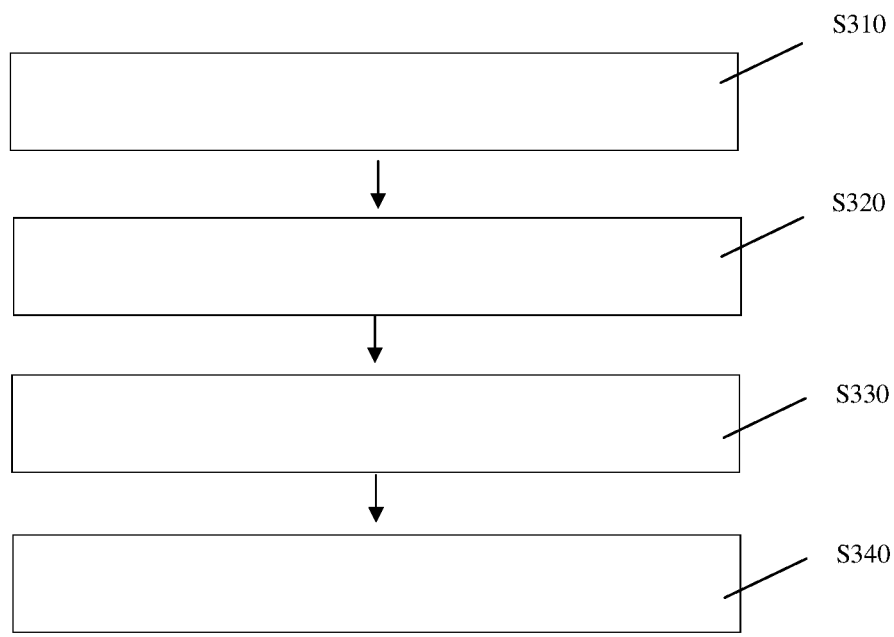
FIG. 4 is a flowchart of mapping the feature map between a feature space and a semantic space by an auto-encoder, in one embodiment of method for enhancing semantic features SAR image oriented small set of samples according to the present disclosure.
Figure 5:
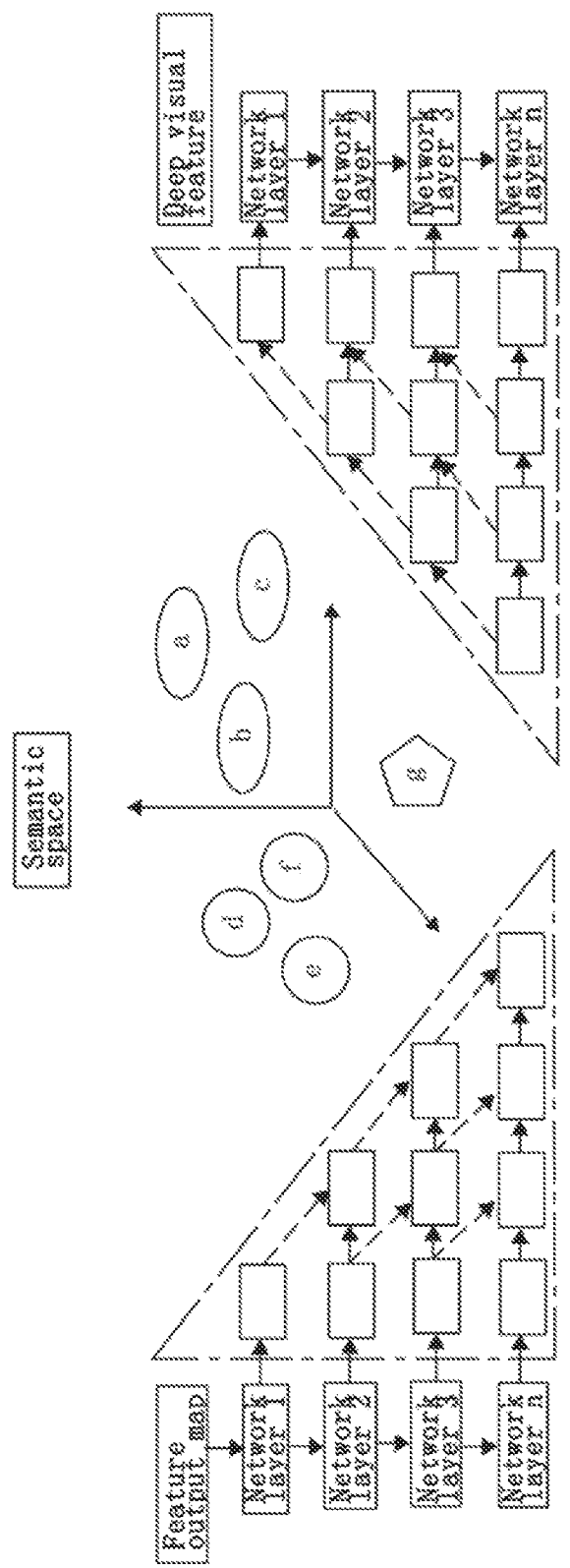
FIG. 5 is a schematic diagram of mapping the feature map between a feature space and a semantic space by an auto-encoder, in one embodiment of method for enhancing semantic features SAR image oriented small set of samples according to the present disclosure.

Further, with reference to FIGS. 4 and 5, in another embodiment of the present disclosure a method for enhancing semantic features of SAR image oriented small set of samples is further provided. The step of mapping, by an auto-encoder, the feature map between a feature space and a semantic space to obtain a deep visual feature with an enhanced semantic feature comprises the following sub-steps.

Step S310: the feature map is input into a neural network, and a feature value of each layer of the neural network is extracted by an encoder.

Step S320: the feature value is simulated by Gaussian white noise to obtain a simulated feature value.

Step S330: the simulated feature value is mapped from a feature space to a semantic space by the encoder to obtain a semantically-enhanced semantic feature value.

Step S340: the semantic feature value is mapped from the semantic space to the feature space by a decoder to obtain a feature-enhanced deep visual feature.

In this embodiment, in the step S310, the feature map is input into a neural network, and a feature value of each layer of the neural network is extracted by an encoder. In the step S320, the Gaussian white noise is noise with a probability density conforming to the normal distribution. In a real environment, noise is often not caused by a single source, but a noise complex from different sources. That is, real noise is composed of random variables with different probability distributions, and each random variable is independent. In accordance with the central limit theorem, the normalization of real noise always approaches to a Gaussian distribution as the number of noise sources increases. Therefore, by simulating the feature value by Gaussian white noise, unknown real noises can be better simulated to obtain a simulated feature value.

In the step S330, the simulated feature value is processed by a decoder, so that the feature value of each layer has different encoding information. Each piece of encoding information represents abstract semantic information of different levels. Meanwhile, the encoder effectively utilizes the difference in the encoding information of the simulated feature value to merge and combine the encoding information, so as to realize the complementation of information. Accordingly, the encoding information can match the output feature space of each layer of the neural network, and the simulated feature value is mapped from the feature space to the semantic space to obtain a semantic feature value with an enhanced semantic feature. Moreover, the semantic feature value contains a semantic feature tag of the category. For example, the category includes airplane, ship, tank or the like.

In the step S340, the decoder has the same architecture as the encoder. The semantic feature value is processed by the decoder, and the enhanced semantic space is remapped and projected to the feature space of the neural network by deformation, dimension transformation, splicing or other methods to obtain a deep visual feature of the semantic feature space with enhanced expression capability. Accordingly, the expressiveness of features is enhanced, and the SAR target recognition performance is improved.

Additionally, with reference to FIGS. 1-4, in another embodiment of the present disclosure a method for enhancing semantic features of SAR image oriented small set of samples is further provided. The recognition method comprises the following steps.

Step S110: An SAR target image is acquired, and a deep neural network of the SAR target image is established.

Step S120: A sample set of virtual images in different aspects of the same category as the SAR target image is acquired, and a parameter and a weight of the sample set are extracted by a feature extraction layer of a convolutional network.

Step S130: The deep neural network of the SAR target image is initialized by using the parameter and weight of the sample set.

Step S210: A Maxout activation function layer is connected behind a last fully-connected layer of the deep neural network, and the SAR target image is input into the deep neural network containing the Maxout activation function layer for feature extraction to obtain a local maximum weight of features.

Step S220: A ReLU activation function layer is connected behind the Maxout activation function layer, and the local maximum weight is input into the ReLU activation function layer for processing to obtain a local optimal weight.

Step S230: An additional fully-connected layer is connected behind the ReLU activation function layer, and the local optimal weight is input into the additional fully-connected layer for classification to obtain a feature map.

Step S310: A gradient loss of the feature map is calculated by a Softmax-MSE loss function, and the gradient loss is minimized by reversely adjusting the optimized deep neural network to obtain a fitted feature map.

Step S310: The feature map is input into a neural network, and a feature value of each layer of the neural network is extracted by an encoder.

Step S320: The feature value is simulated by Gaussian white noise to obtain a simulated feature value.

Step S330: The simulated feature value is mapped from a feature space to a semantic space by the encoder to obtain a semantically-enhanced semantic feature value.

Step S340: The semantic feature value is mapped from the semantic space to the feature space by a decoder to obtain a feature-enhanced deep visual feature.

In this embodiment, in the step S110, an SAR target image is acquired, and a deep residual ResNet network is established by the SAR target image. The deep residual ResNet network preferably uses a residual network structure of ResNet-50. Accordingly, the depth of the network is greatly increased, and the accuracy of feature extraction is improved. Meanwhile, a structure of residual blocks is applied in the deep residual ResNet network, so every two or three network layers are connected in a jump manner. Accordingly, the problem that the network is too deep to train is solved, the training step of the deep network is simplified, and the recognition capability and training speed of the SAR target image are effectively improved. Particularly, the filter in the deep residual ResNet network uses a specification of 5*5, 3*3 or 1*1, the learning rate is 0.001, the training algebra is 100, and the training test batches are 64 and 32, respectively.

In the step S120, a sample set of virtual images of which targets are in different angles, shapes or the like from but in the same category as the target of the SAR target image is acquired, and an optimal parameter and a weight of each layer of the sample set are extracted by a feature extraction layer of a convolutional network. In the step S130, the deep residual ResNet network of the SAR target image is initialized by using the optimal parameter and weight of each layer of the sample set. The initialized network layer is set as any network layer before the last fully-connected layer of the deep residual ResNet network, that is, the serial number of the transferred layer does not exceed the serial number of a layer where the last fully-connected layer is located, so that the each layer of the deep residual ResNet network has a fixed initialization value instead of a randomly set initialization value. Accordingly, the learning capability of the deep residual ResNet network is improved, the problem of insufficient sample size of the SAR target image is solved, the convergence speed of the deep neural network is effectively improved, and the accuracy of SAR target image recognition is improved. The SAR target image may be an image of a target such as an airplane or a ship detected by radar. Then, the sample set of virtual images may be images of the front face, side face of a target such as an airplane, a ship or a tank, and the images of the target in various shapes, acquired on the Internet.

In the step S210, the SAR target image is input into the deep residual ResNet network containing the Maxout activation function layer for feature extraction. Each input feature of the Maxout activation function layer consists of m selectable hidden layer nodes. The local maximum weight of features of the SAR target image is extracted by the following formula:

$$h_i(x) = \max_{j \in [1,k]} (x^T W_{ij} + b_{ij}), W \in R^{d*m*k}, b \in R^{m*k},$$

where $h_i$ is a local maximum weight of the $i^{th}$ feature, $x^T$ is a set of weights of the input features, $W_{ij}$ is a three-dimensional weight matrix of d*m*k, b is a two-dimensional offset vector of m*k, d is the number of input weights, and m is the number of hidden layer nodes. Each hidden layer node consists of k "hidden hidden layer" nodes, the structure of each "hidden hidden layer" is similar to that of the hidden layer node, and all the k "hidden hidden layer" nodes are output linearly.

Therefore, the Maxout activation function layer is a sustainable-learning activation function layer, the change state is determined by W, and the Maxout activation function is a piecewise linear function which can approximate to any convex function and has high fitting capability and nonlinear representation capability, so that the network can have a better local solution.

In the step S220, a ReLU activation function layer is connected behind the Maxout activation function layer. The ReLU activation function layer has unilateral suppression performance A negative value in the local maximum weight output by the Maxout activation function layer is changed to 0, and a positive value remains unchanged. The specific formula is:

$$ReLU(x) = \begin{cases} x, & x > 0 \\ 0, & x \leq 0 \end{cases}.$$

Unilateral suppression processing is performed on the local maximum weight by the ReLU activation function to obtain a local optimal solution, and the unilateral suppression performance of the ReLU activation function layer allows the features of the SAR target image to have sparse activation performance. Accordingly, the gradient divergence caused by the depth of the network is relieved, the convergence speed of the network is quickened, the generalization capability of the features of the SAR target image is enhanced, and the features of the SAR target image are thus more representative.

Therefore, the Maxout activation function is a piecewise linear function which can process data and reduce the output of data in dimensions; the ReLU activation function layer has sparse connectivity, so the training process of the deep residual ResNet network is easier; and, the continuous connection of the Maxout activation function layer and the ReLU activation function layer forms a double activation function layer. The double activation function layer has the properties of both the Maxout activation function and the ReLU activation function. Accordingly, the data of the features of the SAR target image processed by the deep residual ResNet network has a certain data dimensionality reduction capability, and the training process of the network is easier, so that the feature recognition capability of the SAR target image is improved.

In the step S230, an additional fully-connected layer is connected behind the ReLU activation function layer, and the additional fully-connected layer re-fuses and classifies the features of the SAR target image and the local optimal weight thereof and calculates a probability distribution of each feature to obtain a feature map.

In the step S240, a Softmax-MSE loss function layer is connected behind the additional fully-connected layer to calculate a gradient loss of the feature map. If it is assumed that the number of input apparatus of the Softmax-MSE loss function layer is m and the set of input apparatus is $X=\{x_0, x_1, \ldots, x_{m-1}\}$ (where each element in the set of parameters represents a weight of the parameters), the $k^{th}$ parameter weight of the Softmax-MSE loss function layer is subjected to Softmax function transformation to obtain:

$$p_k = \frac{e^{x_k - max(X)}}{\sum_{i=0}^{m-1} e^{x_i - max(X)}},$$

where $p_k$ is a recognition prediction value, $k \in [0, m-1]$, and $p_k = \max([p_0, p_1, \ldots, p_{m-1}])$. Then, the final category prediction value for the parameter output is:

$$\hat{y} = \sum_{k=0}^{m-1} k p_k.$$

If it is assumed that the number of input training samples of the SAR target image is n, the loss value L of the Softmax-MSE loss function layer is:

$$L = \frac{1}{n} \sum_{j=0}^{n-1} (\hat{y}_j - y_j)^2,$$

where $y_j$ is an expected value of $y_j$, i.e., a tag value of the $j^{th}$ image. Then, the gradient of the Softmax-MSE loss function layer is:

$$\frac{\partial L_j}{\partial x_i} = \begin{cases} p_i - 1, & i = y_j \\ p_i, & i \neq y_j \end{cases}.$$

During the calculation of the gradient of the Softmax-MSE loss function, for the weight output of the $i^{th}$ parameter in the additional fully-connected layer of the network model, if the weight is equal to the expected value $y_i$ of the sample, $p_i-1$ is counted in the gradient value; and, if the weight is not equal to the expected value $y_i$ of the sample, $p_i$ is counted in the gradient value.

The sum of the gradient value of the Softmax-MSE loss function layer is calculated. If the sum of the gradient value is large, the sum of the gradient value of the Softmax-MSE loss function layer is decreased by reversely adjusting the weight of the initialization parameter, the learning rate or other factors of optimized deep residual ResNet network, so that the fitting degree of the feature map is enhanced.

With reference to FIG. 5, in the step S310, the feature map is input into a neural network, and a feature value of each layer of the neural network is extracted by an encoder. In the step S320, the Gaussian white noise is noise with a probability density conforming to the normal distribution. In a real environment, noise is often not caused by a single source, but a noise complex from different sources. That is, real noise is composed of random variables with different probability distributions, and each random variable is independent. In accordance with the central limit theorem, the normalization of real noise always approaches to a Gaussian distribution as the number of noise sources increases. Therefore, by simulating the feature value by Gaussian white noise, unknown real noises can be better simulated to obtain a simulated feature value.

In the step S330, the simulated feature value is processed by a decoder, so that the feature value of each layer has different encoding information. Each piece of encoding information represents abstract semantic information of different levels. Meanwhile, the encoder effectively utilizes the difference in the encoding information of the simulated feature value to merge and combine the encoding information, so as to realize the complementation of information. Accordingly, the encoding information can match the output feature space of each layer of the neural network, and the simulated feature value is mapped from the feature space to the semantic space to obtain a semantic feature value with an enhanced semantic feature. Moreover, the semantic feature value contains a semantic feature tag of the category. For example, the category includes airplane, ship, tank or the like.

In the step S340, the decoder has the same architecture as the encoder. The semantic feature value is processed by the decoder, and the enhanced semantic space is remapped and projected to the feature space of the neural network by deformation, dimension transformation, splicing or other methods to obtain a deep visual feature of the semantic feature space with enhanced expression capability. Accordingly, the expressiveness of features is enhanced, and the SAR target recognition performance is improved.

Additionally, in another embodiment of the present disclosure an apparatus for enhancing semantic features of SAR image oriented small set of samples is further provided, comprising at least one control processor and a memory communicated with the at least one control processor. The memory stores program instructions that can be executed by the at least one control processor. The instructions enable, when executed by the at least one control processer, the apparatus to execute the method for enhancing semantic features of SAR image oriented small set of samples described above.

In this embodiment, the feature enhancement apparatus comprises one or more control processors and a memory. The control processor and the memory can be connected by a bus or in other ways.

As a non-transitory computer readable storage medium, the memory can be configured to store non-transitory software programs, non-transitory computer executable programs and modules, such as program instructions/modules corresponding to the feature enhancement methods in the embodiments of the present disclosure. The control processor executes various functional applications and data processing of the feature enhancement apparatus, i.e., implementing the feature enhancement methods in the method embodiments, by running the non-transitory software programs, instructions and modules stored in the memory.

The memory may include a program storage region and a data storage region, wherein the program storage region may store operating apparatuss, and applications required by at least one function; and, the data storage region may storage data created according to the usage of the feature enhancement apparatus, or the like. Additionally, the memory may include a high-speed random access memory, or may include a non-transitory memory, for example, at least one magnetic disk storage device, a flash device or other non-transitory solid-state storage devices. In some implementations, the memory optionally includes a memory remotely arranged relative to the control processor. The remote memory may be connected to the feature enhancement apparatus via a network. Examples of the network include, but not limited to: Internet, intranet, a local area network, a mobile communication network and a combination thereof.

The one or more modules are stored in the memory, and execute, when executed by the one or more control processors, the feature enhancement methods in the method embodiments, for example, the functions of the steps S100 to S300, S110 to S130, S210 to S240 and S310 to S340 in the feature enhancement methods described above.

In an embodiment of the present disclosure it is further provided a computer readable storage medium storing computer executable instructions which can cause, when executed by one or more control processors (e.g., one control processor), the one or more control processors to execute the feature enhancement methods in the method embodiments, for example, the functions of the steps S100 to S300, S110 to S130, S210 to S240 and S310 to S340 in the methods described above.

The apparatus embodiment described above is merely illustrative. The units described as separate components may be or may not be physically separate, that is, the units may be located at one position or may be distributed on a plurality of network units. Some or all of the modules may be selected according to actual needs to achieve the purpose of the solutions of this embodiment.

From the descriptions of the foregoing implementations, it can be clearly understood by those skilled in the art that various implementations may be implemented by means of software and a general hardware platform. Those skilled in that art will appreciate that some or all of flows of implementing the method embodiments can be completed by instructing related hardware through computer programs. The programs can be stored in a computer readable storage medium. When executed, the programs can include the flows of the method embodiments. The storage medium can be a magnetic disk, an optical disk, a Read-Only Memory (ROM), a Random Access Memory (RAM) or the like.

Although the preferred embodiments of the present disclosure have been specifically described above, the present disclosure is not limited to the foregoing implementations. A person of ordinary skill in the art can make various equivalent transformations or replacements without departing from the spirit of the present disclosure, and these equivalent transformations or replacements shall fall into the scope defined by the appended claims of the present application.

What is claimed is:

1. A method for enhancing semantic features of synthetic aperture radar (SAR) image oriented small set of samples, comprising:
   acquiring a sample set of an SAR target image, and performing transfer learning and training on the sample set to obtain an initialized deep neural network of the SAR target image, the sample set comprising the SAR target image and an SAR target virtual image;
   performing network optimization on the deep neural network by an activation function, and extracting features of the SAR target image by the optimized deep neural network to obtain a feature map; and
   mapping, by an auto-encoder, the feature map onto a feature space and a semantic space to obtain a deep visual feature with an enhanced semantic feature:
   wherein acquiring the sample set of the SAR target image and performing transfer learning and training on the sample set to obtain the deep neural network of the initialized SAR target image, comprises:
   acquiring the SAR target image, and establishing a deep neural network of the SAR target image;
   acquiring a sample set of virtual images in different aspects of the same category as the SAR target image, and extracting a parameter and a weight of the sample set by a feature extraction layer of a convolutional network; and
   initializing the deep neural network of the SAR target image by using the parameter and weight of the sample set.

2. The method for enhancing semantic features of SAR image oriented small set of samples according to claim 1, wherein the deep neural network comprises a deep residual ResNet network or DenseNet network.

3. The method for enhancing semantic features of SAR image oriented small set of samples according to claim 1, wherein performing network optimization on the deep neural network by an activation function and extracting features of the SAR target image by the optimized deep neural network to obtain a feature map, comprises:
   connecting a Maxout activation function layer behind a last fully-connected layer of the deep neural network, and inputting the SAR target image into the deep neural network containing the Maxout activation function layer for feature extraction, to obtain a local maximum weight of features;
   connecting a ReLU activation function layer behind the Maxout activation function layer, and inputting the local maximum weight into the ReLU activation function layer for processing, to obtain a local optimal weight; and
   connecting an additional fully-connected layer behind the ReLU activation function layer, and inputting the local optimal weight into the additional fully-connected layer for classification, to obtain a feature map.

4. The method for enhancing semantic features of SAR image oriented small set of samples according to claim 3, wherein performing network optimization on the deep neural network by an activation function and extracting features of the SAR target image by the optimized deep neural network to obtain a feature map, further comprises:
   calculating a gradient loss on the feature map by a Softmax-MSE loss function, and minimizing the gradient loss by reversely adjusting the optimized deep neural network, to obtain a fitted feature map.

5. The method for enhancing semantic features of SAR image oriented small set of samples according to claim 1, wherein the auto-encoder comprises an encoder and a decoder.

6. The method for enhancing semantic features of SAR image oriented small set of samples according to claim 5, wherein mapping, by an auto-encoder, the feature map onto a feature space and a semantic space to obtain a deep visual feature with an enhanced semantic feature, comprises:
   inputting the feature map into a neural network, and extracting, by an encoder, a feature value of each layer of the neural network;
   simulating the feature value by Gaussian white noise to obtain a simulated feature value;
   mapping, by the encoder, the simulated feature value from a feature space to a semantic space to obtain a semantically-enhanced semantic feature value; and
   mapping, by a decoder, the semantic feature value from the semantic space to the feature space to obtain a feature-enhanced deep visual feature.

7. An apparatus for enhancing semantic features of synthetic aperture radar (SAR) image oriented small set of samples, comprising at least one control processor, and a memory for communicating with the at least one control processor and storing instructions, the program instructions executable by the at least one processor to cause the apparatus to perform:
   acquiring a sample set of an SAR target image, and performing transfer learning and training on the sample set to obtain an initialized deep neural network of the SAR target image, the sample set comprising the SAR target image and an SAR target virtual image;
   performing network optimization on the deep neural network by an activation function, and extracting features of the SAR target image by the optimized deep neural network to obtain a feature map; and
   mapping, by an auto-encoder, the feature map onto a feature space and a semantic space to obtain a deep visual feature with an enhanced semantic feature;
   wherein acquiring a sample set of the SAR target image and performing transfer learning and training on the sample set to obtain a deep neural network of an initialized SAR target image, comprises:
   acquiring the SAR target image, and establishing a deep neural network of the SAR target image;
   acquiring a sample set of virtual images in different aspects of the same category as the SAR target image, and extracting a parameter and a weight of the sample set by a feature extraction layer of a convolutional network; and
   initializing the deep neural network of the SAR target image by using the parameter and weight of the sample set.

8. A computer readable storage medium storing computer executable program instructions to cause a computer to perform:
   acquiring a sample set of a synthetic aperture radar (SAR) target image, and performing transfer learning and training on the sample set to obtain an initialized deep neural network of the SAR target image, the sample set comprising the SAR target image and an SAR target virtual image;

performing network optimization on the deep neural network by an activation function, and extracting features of the SAR target image by the optimized deep neural network to obtain a feature map; and mapping, by an auto-encoder, the feature map onto a feature space and a semantic space to obtain a deep visual feature with an enhanced semantic feature;

wherein acquiring a sample set of the SAR target image and performing transfer learning and training on the sample set to obtain a deep neural network of an initialized SAR target image, comprises:

acquiring the SAR target image, and establishing a deep neural network of the SAR target image;

acquiring a sample set of virtual images in different aspects of the same category as the SAR target image, and extracting a parameter and a weight of the sample set by a feature extraction layer of a convolutional network; and initializing the deep neural network of the SAR target image by using the parameter and weight of the sample set.

* * * * *